(12) United States Patent
Dammar (10) Patent No.: US 7,059,931 B2
(45) Date of Patent: Jun. 13, 2006

(54) REDUCED VISIBILITY ROTORCRAFT AND METHOD OF CONTROLLING FLIGHT OF REDUCED VISIBILITY ROTORCRAFT

(75) Inventor: Michael A. Dammar, Brooklyn Park, MN (US)

(73) Assignee: VeraTech Aero-RPV Corporation, Edina, MN (US)

( * ) Notice: Subject to any disclaimer, the term of this patent is extended or adjusted under 35 U.S.C. 154(b) by 0 days.

(21) Appl. No.: 10/855,275

(22) Filed: May 26, 2004

(65) Prior Publication Data

US 2004/0251377 A1 Dec. 16, 2004

Related U.S. Application Data

(60) Provisional application No. 60/473,621, filed on May 27, 2003.

(51) Int. Cl.
*A63H 27/00* (2006.01)
(52) U.S. Cl. .................................. 446/34; 244/17.11
(58) Field of Classification Search ............ 244/17.11, 244/23 B; 446/34, 36, 37, 38, 57, 58, 46; D12/326, 327
See application file for complete search history.

(56) References Cited

U.S. PATENT DOCUMENTS

| | | | |
|---|---|---|---|
| 1,413,316 A | 4/1922 | Bradley | |
| 1,576,913 A | 3/1926 | Jones | |
| 1,651,273 A | * 11/1927 | Heller | .......................... 446/34 |
| 3,119,196 A | * 1/1964 | Alberico et al. | .............. 446/34 |
| 3,632,065 A | 1/1972 | Rosta | |
| 3,700,172 A | 10/1972 | Gallegos, Sr. | |
| 3,752,417 A | 8/1973 | Lagace | |
| 3,873,049 A | 3/1975 | Horsdal | |
| 3,915,414 A | 10/1975 | Shoulders | |
| 4,214,720 A | 7/1980 | DeSautel | |
| 4,386,748 A | 6/1983 | Jordan | |
| 4,795,111 A | 1/1989 | Moller | |
| 4,824,048 A | 4/1989 | Kim | |
| 4,976,395 A | 12/1990 | Von Kozierowski | |
| 5,064,143 A | 11/1991 | Bucher | |
| 5,070,955 A | 12/1991 | Lissaman et al. | |
| 5,082,079 A | 1/1992 | Lissaman et al. | |
| 5,213,284 A | 5/1993 | Webster | |
| 5,297,759 A | 3/1994 | Tilbor et al. | |

(Continued)

OTHER PUBLICATIONS

Charybdis, American Aircraft Modeler, Oct. 1972 (1 sheet).

(Continued)

*Primary Examiner*—Tien Dinh
(74) *Attorney, Agent, or Firm*—Altera Law Group, LLC; Jeffrey R. Stone (57) ABSTRACT

A rotary aircraft (rotorcraft) in which the entire aircraft rotates about its center of mass as it flies, and in which the center of mass is located external to the aircraft in the generally triangular region formed by the aircraft's single wing and two propellers. As the aircraft flies, the two propellers provide torque about the center of mass and rotate the wing, which provides lift for the aircraft. The aircraft is controllable via a stationary radio transmitter that sends commands for pitch, roll, yaw and altitude. A receiver in the aircraft uses the transmitted signal to establish the aircraft's instantaneous orientation in combination with the sent commands to generate control signals that drive the propeller motors that affect the aircraft's attitude. Pitch and roll are controlled by pulse width modulation of the propeller motor voltages in order to affect the thrust at specific portions of the aircraft's rotation cycle.

34 Claims, 3 Drawing Sheets

U.S. PATENT DOCUMENTS

| | | |
|---|---|---|
| 5,383,810 A | 1/1995 | Loving |
| 5,419,514 A * | 5/1995 | Ducan ..................... 244/12.4 |
| 5,507,453 A | 4/1996 | Shapery |
| 5,634,839 A | 6/1997 | Dixon |
| 5,672,086 A | 9/1997 | Dixon |
| 5,757,288 A | 5/1998 | Dixon et al. |
| 5,873,545 A | 2/1999 | Kapin et al. |
| 5,971,320 A | 10/1999 | Jermyn et al. |
| 6,086,016 A | 7/2000 | Meek |
| 6,193,189 B1 | 2/2001 | Keever |
| 6,322,418 B1 | 11/2001 | Hippely et al. |
| 6,347,764 B1 | 2/2002 | Brandon et al. |

OTHER PUBLICATIONS

Wirral Rocketry Society, articles, monocopter, by Dave Russell, Oct. 2002 (3 sheets).

Apogee Components, "Monocopters", by Francis Graham (1 sheet).

Raytheon Engineers Fly High With Low-Tech Gear; Giving the "Whirl" a Whirl, by Jonathan Karp, Copyright 2004 Raytheon Company (2 sheets).

* cited by examiner

REDUCED VISIBILITY ROTORCRAFT AND METHOD OF CONTROLLING FLIGHT OF REDUCED VISIBILITY ROTORCRAFT

CROSS-REFERENCE TO RELATED APPLICATIONS

Priority is claimed to provisional application No. 60/473,621, filed on May 27, 2003 for ROTARY BODY AIRCRAFT AND METHOD OF CONTROLLING FLIGHT OF ROTARY BODY AIRCRAFT

STATEMENT REGARDING FEDERALLY SPONSORED RESEARCH OR DEVELOPMENT

Not Applicable

BACKGROUND OF THE INVENTION

1. Field of the Invention

The present invention is directed to aircraft, and more particularly to a reduced visibility single wing rotorcraft.

2. Description of the Related Art

A rotorcraft (i.e., an aircraft that is kept partially or completely airborne by airfoils rotating around a vertical axis) has several advantages over conventional airplanes. A rotorcraft can take off and land nearly vertically, without requiring a large runway or landing strip. A rotorcraft can move relatively slowly, compared to the speeds required to maintain flight for an airplane, and can even hover in place. Furthermore, a rotorcraft may have an increased resistance to turbulent wind conditions, due to the potentially large angular momentum of the spinning airfoils or wings.

A helicopter, the most common rotorcraft, has all of the advantages described above, but it is generally a complex and expensive machine, requiring an elaborate control system to ensure that it remains stable as it flies. Typically, the control system for a helicopter controls the pitch (nose up, tail down for positive pitch), roll (left up, right down for positive roll), yaw (nose right, tail left for positive yaw), and altitude.

An improvement over the helicopter is disclosed by Shoulders in U.S. Pat. No. 3,915,414, which describes an aircraft configured as a pod from which a single wing extends. As it flies, the entire aircraft rotates within an air mass to produce lift with the wing (as opposed to a helicopter, which has a non-rotating portion to carry an operator and a payload). The rotation is obtained by jet flow from the trailing edge of the wing adjacent to its tip. A separately rotating impeller within the pod provides the jet flow. The impeller also acts by centrifugal force to normally set a pitch plane for the wing of the craft. A detector interacts with the magnetic field of the earth and generates a signal that is indicative of the angular orientation of the aircraft at any time. A synchronous sensing and remote control system takes into account the angular orientation in operating a control flap positioned in the jet stream as desired to change the plane of rotation and, hence, the direction of translation of the rotating aircraft.

Despite the improvements of Shoulders's device over a conventional helicopter, principally as a reduction in complexity and cost, there are still several drawbacks. The control flap is a moving part that must be engaged and disengaged at the proper points in each rotation cycle as the device flies, and is subject to wear and failure. In addition, the engine is a two-cycle engine that uses a liquid fuel, and must be carefully designed and installed to function properly in the rapidly rotating environment of a rotorcraft. Finally, because a large amount of the device's mass is located in close proximity to the center of mass, the rotational inertia (or moment of inertia) is relatively small.

Furthermore, the device of Shoulders is readily visible (as is the case with most aircraft). If the aircraft of Shoulders were used as a surveillance device, its visibility would be a potential drawback.

Accordingly, there exists a need for a further simplified rotorcraft, which does not rely on a moving part for control that is specifically engaged and disengaged at the proper points in each rotation cycle, does not use a liquid fuel-powered engine, has improved stability during operation due to an increased rotational inertia, and is substantially invisible.

BRIEF SUMMARY OF THE INVENTION

Generally, the present invention relates to a reduced visibility rotorcraft and a method of controlling the reduced visibility aircraft. One embodiment comprises one wing, two thrust generators connected to the wing, and a center of mass that is located external to the rotorcraft. Another embodiment may be circular in shape when viewed from the top, but with an open inner section so as to be shaped like a frisbee or "flying saucer."

An additional embodiment of a method for increasing a rotorcraft's stability during flight comprises providing a rotorcraft with a wing, a longitudinal axis parallel to the wing, and propellers balanced against the wing wherein the propellers are offset on either side of the longitudinal axis, and increasing the moment of inertia for the rotorcraft by increasing the offset of each of the propellers from the longitudinal axis and from each other.

A further embodiment of a method for reducing the visibility of a rotorcraft during rotational flight comprises providing a rotorcraft with a wing and at least two thrust generators connected to the wing, locating the rotorcraft's center of mass outside of the rotorcraft, flying the rotorcraft so that it rotates during flight, and utilizing persistence of vision to reduce visibility of the rotating rotorcraft.

A further embodiment of a method of remotely controlling the flight of a reduced-visibility rotorcraft comprises providing a rotorcraft having a wing and at least two thrust generators, wherein the thrust generators define at least one rotational path, ensuring the rotorcraft's center of mass is located external to the rotorcraft's structure, and varying the thrust applied by the thrust generators at any location along the at least one rotational path of the thrust generators.

Another embodiment provides a method for controlling the flight of a rotorcraft wherein the rotorcraft may be circular in shape when viewed from the top, but with an open inner section so as to be shaped like a frisbee or "flying saucer."

BRIEF DESCRIPTION OF THE SEVERAL VIEWS OF THE DRAWINGS

FIG. 2 schematically illustrates the orientations of the thrust vectors, the wing and the center of mass of the reduced visibility single-wing rotorcraft, in top (2a), side (2b) and end-on (2c) views.

DETAILED DESCRIPTION OF THE INVENTION

An aircraft that relies on persistence of vision to fool the eyes and gives the illusion of invisibility or reduced visibility is provided. Persistence of vision, as it is known, effectively imparts a low-pass filter on the motions that the eyes observe, and may fool the viewer into seeing a time-averaged version of motion that occurs to quickly to resolve.

For instance, consider common motion pictures. Movies are generally shot at 24 frames per second, in which continuous motion is stored as discrete images on film. The discrete images are projected onto a screen with short-duty cycle bursts of darkness between the frames, and the viewer sees the projected discrete images as continuous motion, simply because the eye cannot respond quickly enough to resolve the discrete frames.

Another instance of persistence of vision occurs with common fluorescent lighting. A fluorescent tube driven by an AC voltage at 60 Hz (or 60 on/off cycles per second) will appear to have a constant brightness, rather than a rapidly flickering one, because the eye cannot resolve the flicker that quickly. Rather, the viewer perceives an averaged brightness.

Finally, consider a viewer's perception of the blades of a helicopter as it flies. In general, the blades move far too quickly for the viewer to follow, and an observer on the ground may see just a faint blur from the blades as a helicopter passes overhead. Obviously, the observer does in fact see the helicopter, largely due to the non-rotating portion that contains the helicopter's pilot and payload.

If the entire helicopter were to rotate (neglecting the physical difficulties associated with such a scenario), the observer would still see a dark region at the center of mass of the helicopter, surrounded by the faint blur of the blades, which extend far beyond the center of mass. This visibility scenario describes the prior art rotorcraft, in which the center of mass is located inside the rotorcraft, and is therefore clearly visible as the rotorcraft spins.

Figure 1:
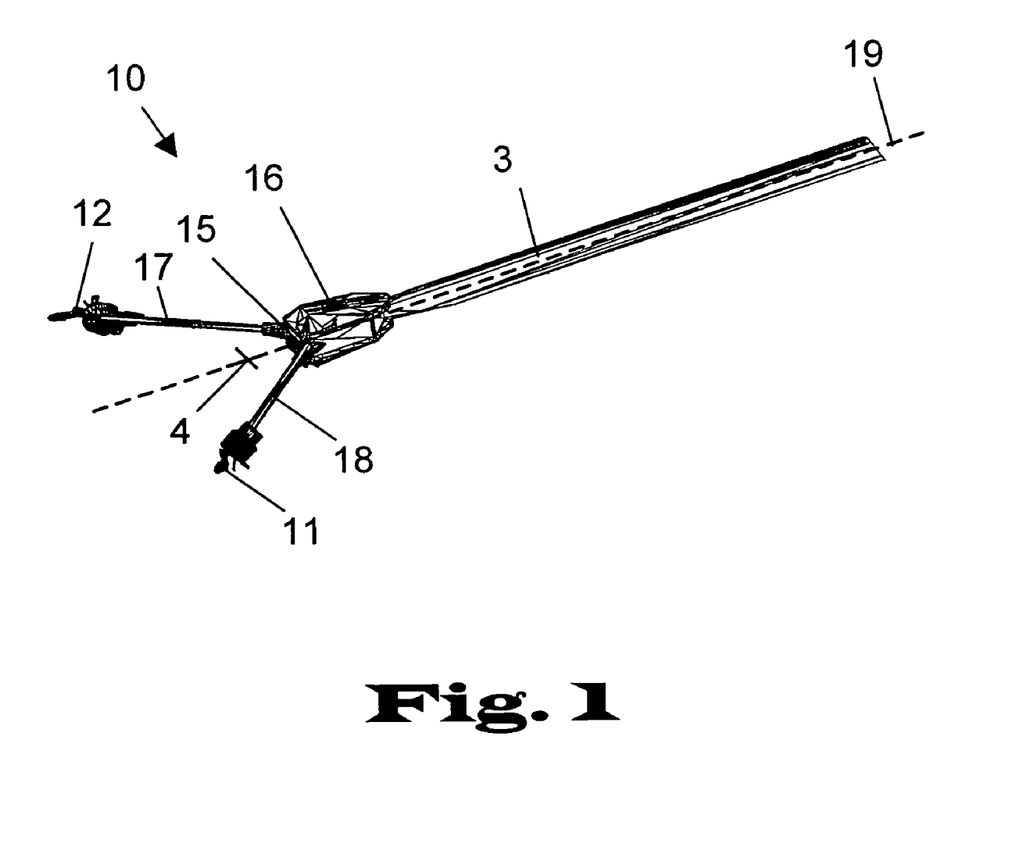
FIG. 1 illustrates an embodiment of a reduced visibility single-wing rotorcraft, with a center of mass located external to the rotorcraft.

Consider now the rotorcraft 10 of FIG. 1, in which the center of mass 4 is located external to the aircraft, wherein the craft's structural elements do not surround the center of mass. As the whole aircraft 10 rotates as it flies, it pivots about its own center of mass 4. If one were to observe such a flying aircraft from the ground, one would be able to see right through the center of mass. In addition, the remainder of the aircraft would appear as a blur, similar to the blurred helicopter blades described above, but even more faint, because there is only one blade to time-average, rather than the several used in a helicopter. The rotorcraft 10 is generally visually undetectable while flying. Likewise, a transparent or translucent material placed at the center of mass would produce the same effect, and an observer on the ground would be able to see right through the flying aircraft to the sky at its center of mass. For instance, a substantially visually transparent material such as glass or plastic may be placed at the center of mass, and would allow an observer on the ground to see directly through the center of mass. In addition, the material may be translucent, such as ground glass.

Note that in a helicopter, for example, the center of mass may be located inside the stationary portion, and that there may be no material located at the center of mass. Obviously, a helicopter is not invisible, and the rotorcraft 10 of FIG. 1 differs from a helicopter in that no visually opaque material surrounds the center of mass 4. As the rotorcraft 10 flies, it spins about its center of mass 4 and uses the persistence of vision to blur the appearance of the entire rotorcraft 10; if the center of mass 4 were opaque, it would be visible, even when spinning.

Ideally, the visibility of the aircraft would be further reduced by coloring all or part of the aircraft the same color as the sky, or by coloring the aircraft black. The visibility of the aircraft is reduced the most during bright sunlight. In the other extreme, during darkness, the visibility of the aircraft is less important.

The reduced-visibility rotorcraft 10 of FIG. 1 preferably has a single wing 3 and a pair of propellers 11 and 12, although multiple wings may be used as well. The center of mass 4 of the rotorcraft 10 is external to the rotorcraft itself, and falls in the generally triangular region between the wing 3 and the two propellers 11 and 12. As the rotorcraft 10 flies, the entire aircraft pivots about its center of mass 4, and an observer on the ground sees essentially nothing, surrounded by a faint blur caused by the persistence of vision of the entire aircraft. The propellers 11 and 12 primarily provide torque about the center of mass 4, which rotates the rotorcraft 10, and the wing 3 primarily provides lift for the rotorcraft 10 as it rotates. Although the propellers 11 and 12 are shown as equidistant from the center of mass 4 in FIG. 1, they may also be located different distances from the center of mass 4. The propeller supports 17 and 18 are shown as being symmetric with respect to the longitudinal axis 19 of the aircraft, although they may also be asymmetrically located as well. Likewise, the center of mass 4 may be offset from the longitudinal axis 19.

The rotorcraft 10 optionally has a pod or housing 16 that may hold control electronics, one or more power supplies such as a battery, a camera 15, an infrared sensor (not drawn) or an optional payload. Alternatively, the rotorcraft 10 may not have a pod or housing, but may incorporate one or more of the above items into the body of the aircraft 10. For instance, there may be two batteries in the rotorcraft, with each located in close proximity to a propeller. Or, the control electronics may be embedded in the wing 3. For each embodiment, care must be taken to ensure the stability of the device as it flies, as well as ensuring that the center of mass 4 is located appropriately, preferably external to the rotorcraft 10. Furthermore, the housing 16 may have actuators that control the orientation of the wing 3 or the propellers 11 and 12, with respect to the other rotorcraft components. In general, the wing 3 and propellers 11 and 12 are connected by methods known to one skilled in the art, such as welding, soldering, use of threaded fasteners, and so forth. Alternatively, the entire rotorcraft 10 may be constructed in a unitary body, incorporating the functions of the wing 3, and having mounts for the propeller motors.

Figure 2A:
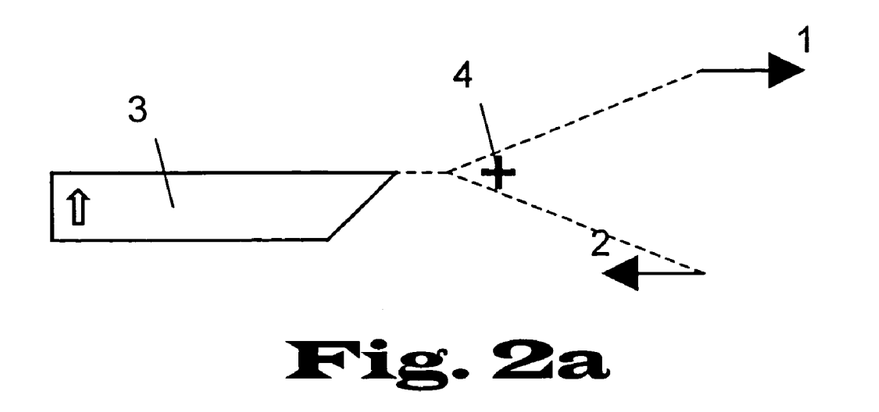
Figure 2B:
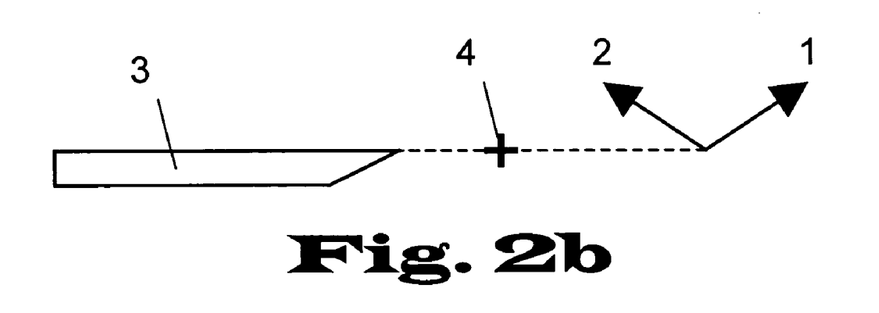
Figure 2C:
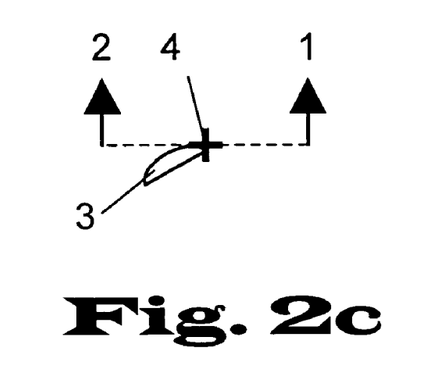

FIG. 2 shows a schematic diagram of the rotorcraft, which has thrust vectors 1 and 2, and wing 3, all shown in top (FIG. 2a), side (FIG. 2b), and end-on (FIG. 2c) views. The center of mass 4 is denoted by the intersection of dotted lines. As it flies, the entire rotorcraft rotates about its center of mass 4, with the direction indicated by the arrow in the top view. Although the direction of rotation is drawn as clockwise in FIG. 2a, it will be appreciated that a counterclockwise rotation may also be used. It will be appreciated that the dotted lines are merely for reference, and do not necessarily directly correspond to any mechanical linking structure among the elements. Furthermore, the elements in FIG. 2 are not drawn to scale.

The components of thrust vectors 1 and 2 are shown FIG. 2. In a preferred embodiment, the thrust vectors 1 and 2 are generated by propellers that rotate in planes perpendicular to each of the thrust vectors 1 and 2, although other methods of propulsion may be used, including jet engines, impellers, rockets, and so forth. It will be appreciated by one skilled in the art that other methods of propulsion, or thrust generators, may be substituted as well. For the remainder of the discussion herein, the terms thrust vector and propeller may be interchangeable, in that a propeller generates a thrust vector in the plane perpendicular to the one in which it rotates.

When the propellers are powered, they provide thrust to the rotorcraft in the direction given by the thrust vectors 1 and 2 drawn in FIG. 2. The primary function of the propellers is to provide torque about the center of mass 4, in addition to secondary functions of steering and providing a small amount of lift. In addition, one skilled in the art may readily orient the direction of the propellers so that the torques generated by the propeller motors may preferably add to (rather than cancel out) the torques generated by the thrust vectors.

The wing 3 preferably provides the majority of the lift for the rotorcraft as it flies. As the rotorcraft spins clockwise in the top view, the wing 3 generates lift that is oriented substantially upward in FIGS. 2b and 2c, although the lift may have additional non-vertical components as well. The propellers may provide additional lift, although the lift generated by the wing 3 is preferably substantially larger than the lift generated by the propellers during normal operation. Note the approximate shape of the wing 3 in FIG. 2c, in that the top and bottom of the wing are not the same shape. This preferable style of wing is similar to those used in conventional airplanes, and it generates lift vertically as it travels horizontally through the air. Alternatively, a different style of wing may be used, such as the style used in helicopter blades, in which the top and bottom are symmetrical. Care must be taken to properly adjust the pitch in accordance with well-known design principles.

Note that the actual orientations of the thrust vectors 1 and 2 may vary from the representative schematics of FIG. 2, and may also each vary from the anti-parallel orientation of FIG. 2. Preferably, neither propeller is strictly vertical or strictly horizontal. The precise angles may be varied in the range between horizontal (with thrust vectors that lie parallel to the ground) and vertical (thrust vectors pointing directly upward or, less preferably, downward). One skilled in the art will understand that altering the angular orientations of the thrust vectors 1 and 2 will affect quantities like efficiency, take-off speed, stability and aircraft attitude during flight. It will be appreciated that the design trade-offs among these and other quantities depend on the specific application for which the rotorcraft is to be used.

Note that the orientations of the propellers, and their associated thrust vectors, are preferably fixed, and preferably do not change during flight. Alternatively, the rotorcraft may include a mechanism that changes the position of the propellers during flight, in response to a control that is generated either remotely or within the rotorcraft itself.

Alternatively, there may be an optional mechanism for changing one or both of the propeller positions before the aircraft is flown. For instance, a particular application may be better served if the thrust vectors are more vertical than horizontal, and the rotorcraft may have an optional adjustment for the propellers that allows the user to change the propeller orientation before the aircraft is launched. These adjustment mechanisms are well-known in the art, and may include notched positioners, pivotable hinges with locking thumbscrews, and the like. The user may select from one of a set of pre-defined positions, or may adjust the propellers along a continuum of positions.

As the rotorcraft flies, it rotates about its center of mass, denoted by element 4 in FIG. 2. (As stated earlier, the dotted lines in FIG. 2 are not representative of any physical structure or frame.) By choosing carefully the placement of the wing 3 and two propellers 1 and 2, as well as the power source(s), propeller motors, and control electronics, one may place the center of mass 4 in a location that is visually unobstructed by the connecting frame, preferably in the region between the wing and the two propellers. If the center of mass 4 is visually unobstructed, then one may see through it, and the rotorcraft may have a tremendous advantage over prior art aircraft in that it may fly without being seen easily.

Note that in FIGS. 2a and 2c, the center of mass 4 need not be located exactly halfway between the two propellers. For instance, the center of mass 4 may be offset somewhat in the direction of thrust vector 2, in order to account for the mass of the wing 3. Likewise, the center of mass 4 may also be offset somewhat in the direction of thrust vector 1. As stated earlier, FIG. 2 is merely a schematic drawing and is not to scale.

An important advantage of such a low-visibility rotorcraft becomes apparent when an optional camera 15 is mounted on or in the rotorcraft, as illustrated in FIG. 1. For instance, a digital camera may be mounted on or in the frame near the wing 3, generally pointed downward and toward the propellers 11 and 12. As the rotorcraft flies, the camera may capture a near-panoramic image of the ground, refreshing once for each revolution of the aircraft. The image or images may be stored locally on the aircraft in a memory device, and may be transferred from the memory device for use after the aircraft lands.

Alternatively, the images may be transmitted directly from the aircraft to a stationary observer, possibly along with orientation data that allows the observer to obtain a 360-degree view of a particular landscape, over which the aircraft flies. One potential way of viewing this transmitted image data may be in a virtual headset worn by the observer. As the observer turns his head, he may see different portions of the landscape. The observer may also see near-real-time video of the landscape, with a refresh that occurs once per revolution of the rotorcraft. Furthermore, the camera may acquire a substantially real-time panoramic view of the space below and/or above the rotorcraft. For example, the rotorcraft may image both a helicopter above and troops below the rotorcraft, with a refresh occurring once per revolution of the rotorcraft.

Alternatively, the cameras may use film, in the same manner as some older-generation spy aircraft. The film may be recoverable for developing after the aircraft is retrieved.

Take-offs and landings may occur without the use of an extended runway or landing strip. The rotorcraft may take off under a variety of circumstances. For instance, the aircraft may take off from a rest position on relatively flat ground. The motorized propellers provide enough initial lift to get the wing airborne, then the wing spins and generates its own lift. Or, the rotorcraft may be dropped from an airplane, fired from a mortar shell, or thrown by a human operator. These are merely examples, and do not limit the scope of the invention. The rotorcraft may land on relatively flat terrain as well, similar to the way some model aircraft may "crash land" without significant damage. In addition, the rotorcraft may be programmable, with a take-off occurring at a pre-determined time, possibly with no human intervention. For instance a rotorcraft may be left behind as a troop unit passes through a given location, and the rotorcraft may be programmed to take-off a certain amount of time later, in order to see if they are being followed and by whom.

Alternatively, the aircraft may have one or more wheels on the bottom to reduce friction and reduce potential damage during take-offs and landings. As a further alternative, the aircraft may have a dimple or protrusion on the bottom, which may serve as a point contact during landing and take-off.

In one embodiment, the rotorcraft is remote controlled (e.g., radio controlled) with input controls essentially the same as for most model helicopters in which pitch, roll, yaw and altitude are controlled. Unlike helicopters, in which the pitch of the blades is typically altered over a portion of the rotation cycle in order to generate pitch or roll, the preferred embodiment adjusts the relative powers of the two propellers over a portion of the rotation cycle to generate pitch or roll. For instance, over one half-rotation, the first propeller generates more lift than the second propeller, then on the other half-rotation, the second propeller generates more lift than the first propeller. As these half-rotation cycles are repeated through multiple rotations, the aircraft generates pitch and/or roll in the appropriate direction.

Note that the half-rotation cycles described above are employed only when changing the aircraft's orientation. Once a desired pitch or roll is obtained, the two propeller motors run equally again, and the values of pitch and roll are maintained. Note that the pitch and roll values do not automatically settle to zero when the two propeller motors are run equally; rather, they must be manually set to zero (or some other desired value) by using the half-rotation cycles described above.

It is worth noting that the propellers 11 and 12 and perhaps the motors that drive them are deliberately offset from a longitudinal axis 19 parallel to the wing. As the separation between the propellers 11 and 12 increases, the aircraft sees more mass off-axis, and therefore sees a higher moment of inertia with respect to the longitudinal axis 19, and hence, sees more stability while flying. A more stable aircraft shows more resistance to wind and other perturbations while flying, at the expense of nimble maneuverability. One skilled in the art will appreciate the inherent trade-off between stability and maneuverability, and will space the propellers apart by a distance in accordance with an appropriate compromise between the two.

The propeller motors may be driven with any of various voltage schemes in order to affect lift at the appropriate points. In a preferred embodiment, the motors are driven with pulse width modulation (i.e., with pulses of varying length but generally constant amplitude). Use of pulse width modulation generally only requires two voltage levels, and may allow for simplified electronics for driving the motors. Note that the pulses occur more quickly than the motors can respond, and the motors effectively impart a low-pass filter to the motor driving signals. In this manner, a lift profile (with respect to time) for a particular motor may be tailored suitably by adjusting the pulse durations and pulse synchronizations that drive the motor. Alternatively, the rotorcraft may be constructed with only one motorized propeller (or thruster), and a battery (or other mass) replacing one propeller in the Y-shaped design of FIGS. 1 and 2. The single propeller motor power may be cycled in the same manner as when using the two-motor configuration, in order to generate pitch and/or roll.

Alternatively, the propeller motors may be driven by pulse position modulation, by a generally analog signal, or by any of various other modulation schemes well-known in the art.

Note that as with helicopters, the rotorcraft experiences gyroscopic precessional lag. Put simply, if a torque is applied to the spinning rotorcraft, then the rotorcraft's movement in response occurs 90 degrees after the torque is applied. For example, if one wishes to impart pitch to the aircraft, then one applies a difference in lift between the left and right sides of the aircraft. Likewise, a difference in lift between the front and back of the aircraft produces a change in roll. Note that this gyroscopic precessional lag does not occur for non-rotating objects, in which left/right affects roll and front/back affects pitch.

Because the aircraft is continually rotating as it flies, some care must be taken when identifying, say, the "front" or the "rear" of the rotorcraft. Unlike a helicopter, which has a non-rotating portion for a controller and a payload, and thereby has its own preferred orientation for its "front", "back", and so forth, the rotorcraft in the present embodiment has no preferred orientation as it spins. A preferred orientation is therefore chosen with respect to the largely stationary controller on the ground; from the point of view of the controller, the portion of the aircraft farthest away is considered the aircraft's "front". Note that this definition of "front" does not correspond to a physical location on the aircraft, which passes through complete rotations as it flies, but rather corresponds to a reference point by which the rotorcraft may be controlled. This first component of the control system generally detects which portion of the aircraft is currently located at the "front", for instance (or some other arbitrary reference point), and may return a phase value that cycles through 360 degrees for each rotation of the aircraft during flight. This phase value may be used to convert a spinning image recorded by a camera on the rotorcraft into a stationary image, which may refresh upon each rotation of the aircraft.

The phase value may also be used to generate yaw, in analogy with the typical controls for a helicopter. By applying an offset to the phase value, the "front" of the aircraft may be effectively moved away from the farthest point from the stationary controller.

Figure 3:
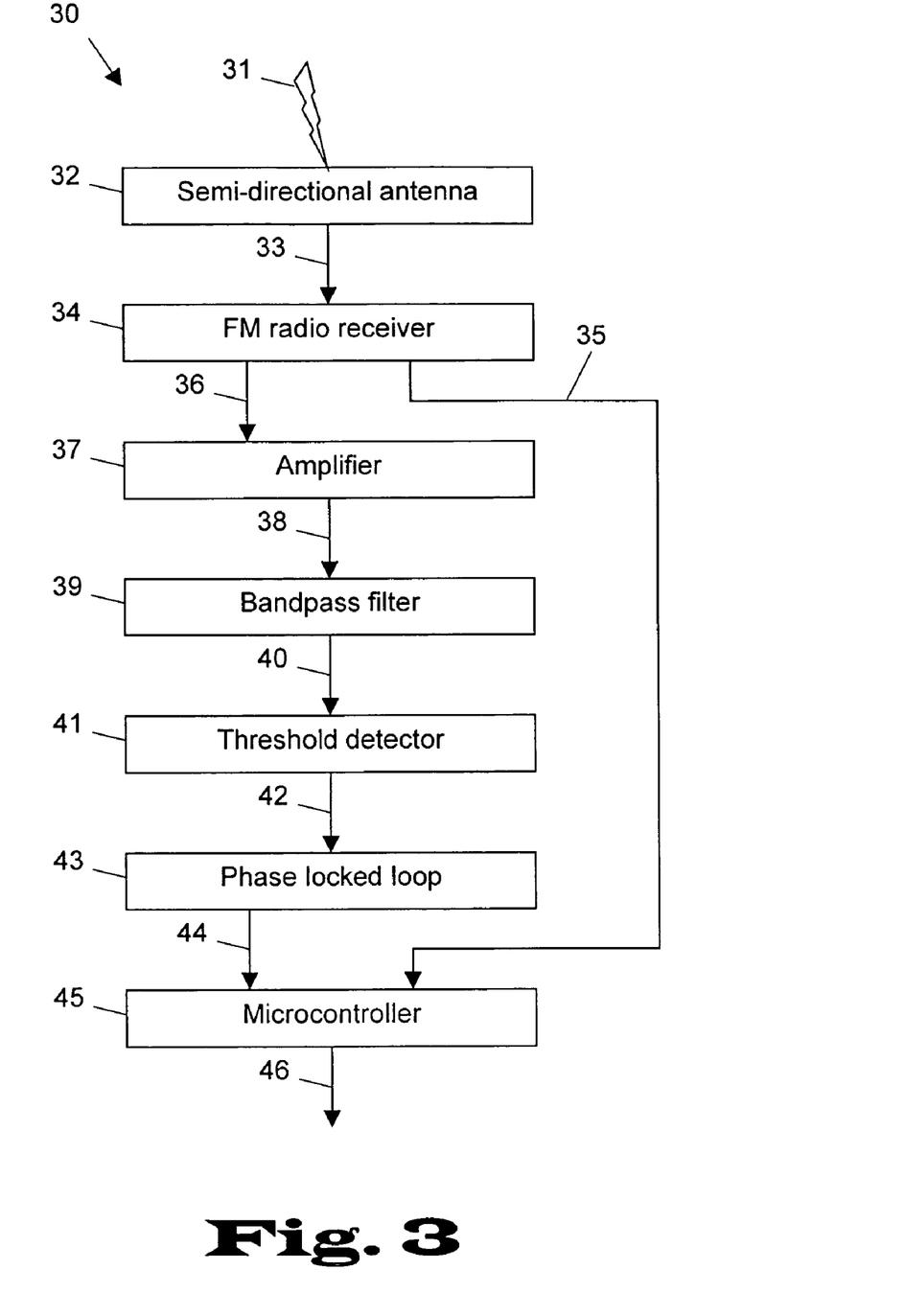
FIG. 3 schematically illustrates the control system for the reduced visibility single-wing rotorcraft.

FIG. 3 shows a schematic of a preferred embodiment of a control system used in the rotorcraft. In one embodiment, the actual circuitry to perform the control functions may be located external to the rotorcraft, such as located with the generally stationary transmitter controlled by the user. In a preferred embodiment of FIG. 3, the generally stationary transmitter sends only simple commands, representing pitch, roll, yaw, and altitude and their associated degrees, and the rotorcraft contains all the remaining circuitry and control systems required to convert the simple commands into voltages that drive the propeller motors in response to the simple commands. Alternatively, the generally stationary transmitter may be programmable, so that the commands to take-off, fly, or land may be sent without direct human control in real-time.

The control system 30 of FIG. 3 receives the simple commands emitted by the generally stationary transmitter and ultimately generates the control signals sent to the propeller motors. The generally stationary transmitter (not drawn) may emit a transmitted signal 31 on a radio frequency, containing information about the desired pitch, roll, yaw and altitude, which is preferably encoded as pulse width modulation on the radio frequency. The transmitted signal 31 preferably does not contain any information about the actual rotorcraft's location or orientation.

A semi-directional antenna 32 receives the transmitted signal 31 and generates a received signal 33. Because of the directionality of the antenna 32, which is mounted on the rotating aircraft, the received signal 33 has an amplitude that varies cyclically, reaching a maximum when the antenna is aligned with the generally stationary transmitter, and a minimum when it is misaligned by a phase of 180 degrees. This rotation-dependent modulation of the received signal 33 operates at a much lower frequency than the pulse width modulation of the transmitted signal 31. In effect, the received signal 33 appears as a pulse width modulated signal, modulated by a relatively slowly-varying gain envelope that passes through a maximum/minimum cycle every time the aircraft goes through one rotation.

The received signal 33 is processed by a radio receiver 34. Preferably, the radio transmitter and receiver both use frequency modulation (FM), so that element 34 may be considered an FM radio receiver. The FM radio receiver 34 produces two outputs. First, the information in the relatively rapidly varying pulse width modulated signal generates control data 35. The control data contains information about the desired pitch, roll, yaw and altitude of the rotorcraft. Second, in the preferred embodiment, the relatively slowly varying gain envelope, which may be obtained indirectly from the automatic gain control (AGC), generates a signal 36 that contains information about the rotation of the rotorcraft. However, other methods of detection will readily present themselves to those skilled in the art. More specifically, signal 36 contains information about the phase of the rotation at any given instant in time; recall that the phase passes through 360 degrees for each particular rotation of the aircraft.

The signal 36 may be amplified by an optional amplifier 37, which generates an amplified signal 38. The amplifier 37 preferably increases the amplitude of the signal 36 without substantially affecting its spectral content.

The amplified signal 38 passes though a bandpass filter 39, which generates a filtered signal 40. The bandpass filter 39 is preferably a low-pass filter that removes the effects of the pulse width modulation, which occurs at a much higher frequency than the rotation speed of the rotorcraft. Alternatively, the order of the amplifier 37 and bandpass filter 39 may be reversed, or their functionality may optionally be combined into one unit.

The filtered signal 40 passes through a threshold detector 41, which generates a series of intermediate output pulses 42. When the filtered signal increases past a given threshold, the output signal goes from a low level to a high level, with the transition in the output signal corresponding to the time at which the threshold is crossed. Similarly, when the filtered signal decreases past a given threshold, the output signal goes from a high level to a low level, also with the transition in the output signal corresponding to the time at which the threshold is crossed. The intermediate output pulses 42 typically have two voltage levels, corresponding to a high value and a low value.

The intermediate output pulses 42 pass through a phase locked loop 43, which effectively "fills in" any missing pulses with pulses that resemble a previous pulse. In other words, the phase locked loop 43 regenerates any pulses that might be missing, due to an obscured radio signal or the like. If there are no missing pulses, the phase locked loop 43 follows the intermediate output pulses 42. The output from the phase locked loop 43 is a series of stable output pulses 44. In an alternate embodiment, the band pass filter 39, threshold detector 41 and the phase locked loop 43 and any combination thereof, may be integrated into a microcontroller 45.

The control data 35 and the stable output pulses 42 are processed by a microcontroller 45. The control data 35 has information about the desired attitude of the rotorcraft, and the stable output pulses 42 have information about the instantaneous orientation of the rotorcraft—specifically, the phase of the rotorcraft. The microcontroller 45 generates a series of control signals 46 that drive the propeller motors (not drawn). The microcontroller 45 may preferably account for the frequency response and systematic delays in the propeller motors, so that the lift generated by the propellers occurs at the proper portions of the rotation cycle.

The rotorcraft may use an optional locating system as backup, in the event that contact between the transmitter and the rotorcraft is disrupted, or in the event that the phase of rotation is not reliably generated by the control system. The optional locating system may detect an existing broadcast signal, such as that from an AM or FM radio station or a TV station, which is presumed to be stationary, and uses the existing broadcast signal to generate the phase. For this optional locating system, the stationary radio station replaces element 31 in FIG. 3 and is used to generate a series of stable output pulses 44, with the remainder of the control system 30 functioning generally as before. When used in this manner, the stationary radio station may be referred to as a fixed orientor. If the control data 35 also fails, one option is to fly straight. A second option is to use the previous set of control commands that were used before the failure.

Optionally, the rotorcraft may have a position sensor that operates independently of the transmitter location, such as a Global Positioning System (GPS). With a GPS receiver, the rotorcraft would know where it is and which direction it facing without the need for certain elements of the control system 30 of FIG. 3.

With the use of a GPS sensor or its functional equivalent, certain flight paths may be automated. For instance, the user may enter a series of GPS coordinates into the controller unit, or program them directly into the aircraft before launch, then launch the aircraft to fly to the given coordinates, perhaps at a particular height, capture a series of images if desired, or drop a payload if desired, then return to a designated landing site, which may or may not be near the launch site.

In another embodiment, an automated flight may use a series of manual instructions, such as how high, how far, or how long to fly. The controller or the aircraft may optionally have a "point and click" system, in which a destination is located visually, such as a tree, a button is depressed (or some other functional equivalent), and the controller may record the distance and height to the destination. After the destination is recorded, the rotorcraft may fly to the destination, optionally capture pictures, engage a sensor, or drop a payload, then return to a designated landing site. In this and other automated flight schemes, the user generally does not manually control the attitude of the plane as it flies. Preferably, the aircraft takes off, carries out its mission, and lands, all automatically.

One subtlety of such automated flight schemes is the need for self-leveling or self-righting. In other words, if the aircraft is supposed to fly with a particular attitude, then it needs a servo system to detect its orientation and generate the control signals to orient the aircraft as programmed. In one embodiment of a self-leveling scheme, a sensor such as an infrared sensor is mounted somewhere on the aircraft, preferably with an unobstructed view such as through the center of mass. The sensor detects a thermal profile from the surrounding terrain as the rotorcraft spins. If the rotorcraft is level, the resulting sensor signal is roughly uniform over a complete rotation of the aircraft, simply because the thermal horizon is roughly uniform in all directions. If the rotorcraft departs from level, then the detected signal shows an imbalance at certain portions of the rotation cycle, and may be used to generate a servo signal that brings the rotorcraft to a level condition. In a second embodiment of a self-leveling scheme, an accelerometer may be used in generally the same manner as the infrared sensor described above. If the rotorcraft is level, then the accelerometer produces a generally constant value over the complete rotation cycle. If the rotorcraft departs from level, then the accelerometer signal may be used to produce a leveling servo signal.

A further embodiment incorporates one or more sensors in a broader sense than simply an image-generating camera. The sensor(s) may include infrared, visible, ultraviolet, radio frequencies, ultrasound, magnetic, chemical (like a "chemical sniffer"), and other sensors. For instance, the rotorcraft may be used to detect the presence of a particular chemical some distance away.

In a further embodiment, the supports that connect the propellers to the wing may be collapsible. For instance, the rotorcraft may be stored generally flat in a sheath, then unfolded and launched when appropriate.

In a further embodiment, a servo may be incorporated that dynamically controls the attack angle of the wing or blade. Such a system is routinely used in helicopters to affect the lift of the blades at various portions of the rotation cycle, and the system is largely responsible for generating pitch and roll. In the embodiment of the rotorcraft, such a servo may be used in addition to, or instead of cycling the propeller motor throttles, as described above.

In a further embodiment, the rotorcraft may use two, or more, wings, located on opposite sides of the center of mass. By carefully designing the support mechanism for the wings so that the mass is fairly even distributed radially, one may preserve the reduced visibility of the aircraft. In other words, it is preferable that a continuous, radially-symmetric ring about the center of mass not be used, because as it spins, one would easily perceive the ring. For example, a spiral-shaped mount is preferable, in that as the spiral spins, there is little mass at any given distance away from the center of mass, and the spiral tends to blur favorably as it spins.

Another alternate embodiment not shown in the figures is a rotorcraft that circular in shape when viewed from the top, but with an open inner section so as to be shaped like a frisbee or "flying saucer." Such an embodiment may have at least one propeller or other form of thrust generators and rotates during powered flight. In this case, the control mechanisms described above apply to this embodiment of the rotorcraft.

I claim:

1. A rotorcraft capable of powered rotational flight, comprising:
    one wing;
    at least one thrust generator operatively connected to the wing; and
    a center of mass that is located external to the rotorcraft, wherein the rotorcraft rotates about the center of mass.

2. The rotorcraft of claim 1, wherein the rotorcraft does not surround the center of mass.

3. The rotorcraft of claim 1, further comprising the at least one thrust generator defining a radial path, the at least one thrust generator being responsive to control signals for varying thrust at any selected position along the respective path to control the flight direction of the rotorcraft.

4. The rotorcraft of claim 1, further comprising the at least one thrust generator being a propeller.

5. The rotorcraft of claim 1, further comprising the at least one thrust generator being an impeller.

6. The rotorcraft of claim 1, further comprising the at least one thrust generator being a jet engine.

7. The rotorcraft of claim 1, further comprising the at least one thrust generator being a rocket.

8. The rotorcraft of claim 4, further comprising at least one electric motor, the motor drivingly connected to the at least one propeller.

9. The rotorcraft of claim 8, further comprising the at least one electric motor being driven with pulse width modulation.

10. The rotorcraft of claim 8, further comprising at least one battery, the battery providing power to the at least one electric motor.

11. The rotorcraft of claim 1, further comprising:
    a longitudinal axis; and
    at least two supports, the at least two supports being offset on either side of the longitudinal axis and operatively disposed between the wing and the at least one thrust generator.

12. The rotorcraft of claim 11 wherein the at least two supports are equally offset from the longitudinal axis.

13. The rotorcraft of claim 11, wherein the at least two supports are unequally offset from the longitudinal axis.

14. The rotorcraft of claim 1, further comprising at least two wings.

15. The rotorcraft of claim 11, further comprising a housing pod disposed between the wing and at least two supports.

16. The rotorcraft of claim 15, wherein the housing pod holds at least one component selected from the group consisting of: flight control electronics, at least one electronic propeller motor, at least one battery, a digital camera capable of taking still photos or video, an infrared sensor, a global positioning sensor, a visible light sensor, an ultraviolet light sensor, a radio frequency sensor, an ultrasound sensor, a magnetic field sensor, and a chemical detection sensor.

17. The rotorcraft of claim 1, further comprising the rotorcraft being of unitary body construction.

18. The rotorcraft of claim 17, further comprising integrating at least one component into the unitary body constructed rotorcraft, selected from the group consisting of: flight control electronics, at least one electronic propeller motor, at least one battery, a digital camera capable of taking still photos or video, an infrared sensor, a global positioning sensor, a visible light sensor, an ultraviolet light sensor, a radio frequency sensor, an ultrasound sensor, a magnetic field sensor, and a chemical detection sensor.

19. The rotorcraft of claim 1, further comprising the orientations of the at least one thrust generator being fixed.

20. The rotorcraft of claim 1, further comprising the orientations of the at least one thrust generator being changeable prior to flight.

21. The rotorcraft of claim 1, further comprising the orientations of the at least one thrust generator being changeable during flight.

22. The rotorcraft of claim 21, further comprising a remote control for changing the at least one thrust generator orientation during flight.

23. The rotorcraft of claim 1, further comprising control electronics and a remote control for controlling the altitude and direction of the rotorcraft during flight.

24. The rotorcraft of claim 16, further comprising a remote control for controlling the components during flight.

25. The rotorcraft of claim 18, further comprising a remote control for controlling the components during flight.

26. The rotorcraft of claim 1, further comprising at least one wheel disposed beneath the wing to aid in landing.

27. The rotorcraft of claim 1, further comprising a landing protrusion disposed beneath the wing to aid in landing.

28. The rotorcraft of claim 16, wherein the components further comprise a transmitter that provides automated flight path capability for the rotorcraft using the global positioning sensor.

29. The rotorcraft of claim 16, wherein the components further comprise:
   a servo system to self-level the rotorcraft during flight; and
   a sensor capable of detecting a thermal profile from the surrounding terrain.

30. The rotorcraft of claim 29 wherein the sensor comprises an infrared sensor.

31. The rotorcraft of claim 16, wherein the components further comprise a servo system to self-level the rotorcraft during flight, including an accelerometer capable of detecting whether the rotorcraft is level and providing the servo system with level detection data.

32. The rotorcraft of claim 11, further comprising the at least two supports being collapsible to allow flat storage and rapid unfolding and launch.

33. The rotorcraft of claim 17, further comprising a servo integrated in the unitary constructed body to dynamically control the attack angle of the wing.

34. The rotorcraft of claim 33, further comprising a remote control for controlling the attack angle of the wing.

* * * * *